(12) United States Patent
Fournier

(10) Patent No.: US 7,930,990 B2
(45) Date of Patent: Apr. 26, 2011

(54) POINTER WITH A FITTED COVER FOR A GAUGE OR SIMILAR AND A METHOD OF FABRICATING FITTED COVERS

(75) Inventor: Joël Fournier, Cergy (FR)

(73) Assignee: Johnson Controls Technology Company, Holland, MI (US)

( * ) Notice: Subject to any disclaimer, the term of this patent is extended or adjusted under 35 U.S.C. 154(b) by 531 days.

(21) Appl. No.: 11/794,618

(22) PCT Filed: Dec. 27, 2005

(86) PCT No.: PCT/FR2005/003283
§ 371 (c)(1),
(2), (4) Date: Jul. 3, 2007

(87) PCT Pub. No.: WO2006/072702
PCT Pub. Date: Jul. 13, 2006

(65) Prior Publication Data
US 2009/0266292 A1      Oct. 29, 2009

(30) Foreign Application Priority Data
Jan. 5, 2005 (FR) .................................... 05 00069

(51) Int. Cl.
*G01D 13/22*      (2006.01)

(52) U.S. Cl. .................... 116/332; 116/328; 116/DIG. 6
(58) Field of Classification Search ........ 116/62.1–62.4, 116/284, 286, 288, 303, 304, 319, 327–329, 116/331, DIG. 5, DIG. 6, DIG. 36; 362/23, 362/26–30
See application file for complete search history.

(56) References Cited

U.S. PATENT DOCUMENTS

| 2,902,970 | A   | * | 9/1959  | Kadlec ........................ 116/288 |
| 5,636,589 | A   | * | 6/1997  | Kato et al. .................... 116/286 |
| 6,189,480 | B1  | * | 2/2001  | Staley et al. .................. 116/288 |
| 6,408,784 | B1  |   | 6/2002  | Ross |
| 6,820,991 | B2  | * | 11/2004 | Wakaki et al. ................. 362/27 |
| 7,191,730 | B2  | * | 3/2007  | Araki et al. ................... 116/288 |
| 7,814,859 | B2  | * | 10/2010 | Fournier ...................... 116/328 |
| 2007/0035960 | A1 | * | 2/2007 | Birman et al. ................. 362/489 |

FOREIGN PATENT DOCUMENTS

| EP | 0 616 922 B1 | 9/1994 |
| EP | 0 984 249 A1 | 3/2000 |
| FR | 2 747 188    | 10/1997 |

* cited by examiner

*Primary Examiner* — Amy Cohen Johnson
(74) *Attorney, Agent, or Firm* — Foley & Lardner LLP

(57) ABSTRACT

An exemplary embodiment of a pointer for a gauge includes a body of transparent material, the body including a hub and an indicator portion extending from the hub. The pointer further includes a fitted cover of transparent material to cover the body, the fitted cover including a visible pattern.

12 Claims, 1 Drawing Sheet

US 7,930,990 B2

POINTER WITH A FITTED COVER FOR A GAUGE OR SIMILAR AND A METHOD OF FABRICATING FITTED COVERS

CROSS-REFERENCE TO RELATED PATENT APPLICATIONS

The present application is a National Stage of International Application No. PCT/FR2005/003283 filed on Dec. 27, 2005, which claims the benefit of French Patent Application No. FR050069, filed Jan. 5, 2005. The entire disclosures of International Application No. PCT/FR2005/003283 and French Patent Application No. FR050069 are incorporated herein by reference.

BACKGROUND

The present application generally relates to a pointer with a fitted cover carrying a pattern for a gauge or similar. The present application also relates to a method of fabricating fitted covers for pointers.

Pointers are known that include a body of transparent material with a hub from which there extends an elongated indicator portion.

Such pointers typically have a rear face provided with a white background that reflects to the user light coming from diodes placed under the hub and guided by the indicator portion.

In order to decorate the pointer or in order to enable the pointer to be distinguished on a gauge having a white background, it is known to make a pattern on the front face of the pointer. If it is desired to modify the pattern, it is necessary to change the entire pointer.

SUMMARY

An exemplary embodiment of a pointer for a gauge includes a body of transparent material, the body including a hub and an indicator portion extending from the hub. The pointer further includes a fitted cover of transparent material to cover the body, the fitted cover including a visible pattern.

Another exemplary embodiment relates to a method of fabricating covers for fitting to bodies of pointers. The method includes printing a series of patterns on a sheet of transparent material. The method further includes cutting out sheet portions, each including one of the patterns and thermoforming the sheet portions to obtain covers suitable for fitting to the bodies of pointers.

BRIEF DESCRIPTION OF THE DRAWINGS

The application will become more fully understood from the following detailed description, taken in conjunction with the accompanying figures, in which.

DETAILED DESCRIPTION

Referring generally to the FIGURES, a pointer is shown that includes a body of transparent material having a hub from which there extends an elongated indicator portion. The body of transparent material may be covered by a fitted cover that includes a visible pattern. The fitted cover may be made of transparent material.

The visible pattern of the pointer can be modified by changing the fitted cover. The pointer thus has a pattern that is easily modified.

In addition, the fitted cover contributes in making the light coming from the pointer body more uniform, thus making the pattern more visible, thereby improving the appearance of the pointer.

According to an exemplary embodiment, the fitted cover is a thermoformed portion of a sheet of transparent material. The use of a sheet material enables a pattern to be silkscreen-printed while the sheet material is flat, and then a portion may be cut out from the sheet, and the cut out portion may then be thermoformed in order to obtain the form of a cover that can be fitted to a pointer.

Figure 1:
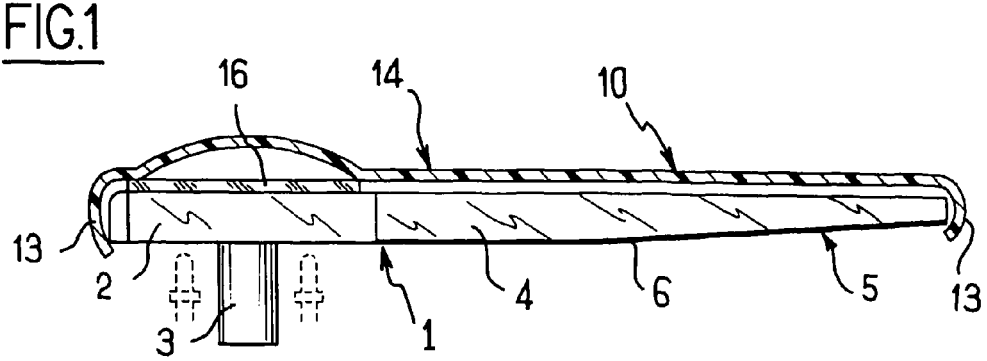
FIG. 1 is a side view of a pointer according to an exemplary embodiment, the fitted cover being cut along the line I-I of FIG. 2.

With reference to FIG. 1, a pointer is shown according to an exemplary embodiment. The pointer includes a body 1 of transparent plastics material. The body 1 may be obtained, for example, by an injection-molding process. The body includes a hub 2 of circular or cylindrical shape. From the center of one of the faces of the hub 2, there extends a stub axle 3 that is designed to be received in a central bearing of a gauge (not shown). From the periphery of hub 2 there extends an indicator portion 4.

According to an exemplary embodiment, the face of the hub 2 carrying the axle 3 includes notches with sloping bottoms (not shown) that enable light coming from light-emitting diodes or LEDs (shown in dashed lines) placed under the hub 2 to be directed toward the indicator portion 4. The indicator portion 4 has a rear face 5 with a reflective coating 6. According to an exemplary embodiment, reflective coating 6 is a white silkscreen print. Reflective coating 6 reflects the light guided by the indicator portion 4 toward the user. The coating 6 is represented by a thick line in FIG. 1.

According to an exemplary embodiment, the body 1 of the pointer is covered by a fitted cover 10 of transparent material (e.g., polycarbonate, etc.).

The fitted cover 10 preferably has dimensions that match those of the body 1 of the pointer so that the fitted cover 10 can be engaged snugly on the body 1. To this end, the fitted cover 10 has side walls 13 that are slightly curved and that cooperate with side walls of body 1 to enable the fitted cover 10 to snap elastically onto the body 1.

Figure 2:
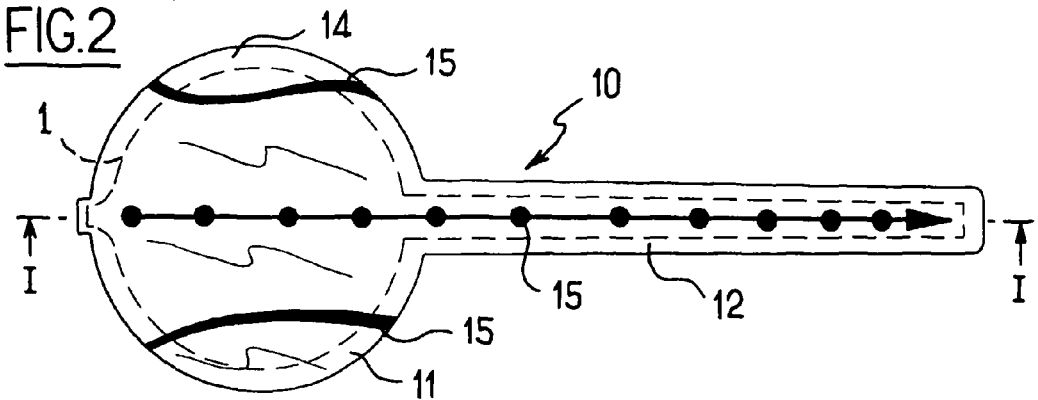
FIG. 2 is a plan view from above of the pointer in FIG. 1.

As can be seen in FIG. 2, the body 1 is shown in dashed lines (the dashed lines represent that the body 1 is fully visible through the fitted cover 10), and the fitted cover 10 has a cylindrical portion 11 adapted to cover the hub 2 of the body 1. Fitted cover 10 also includes an elongated portion 12 adapted to cover the indicator portion 4 of the body 1.

The fitted cover 10 has a front face 14 carrying a pattern 15. In the example shown in FIG. 2, pattern 15 is a stylized arrow extending over the hub 2 and the indicator portion 4, together with two scroll lines extending over the hub 2.

The portion of the arrow that extends over the indicator portion 4 is back-lighted by the light guided by the indicator portion 4 and reflected by the coating 6. The scroll lines and the portion of the arrow extending over the hub 2 are back-lighted by means of a diffusing screen 16 (visible in FIG. 1) that is placed between the hub 2 and the fitted cover 10 and that is adapted to diffuse and homogenize the light coming from the LEDs placed under the hub 2. The diffuser screen 16 may be a transparent plastic disk having its surface finely grooved or a white diffusing plastic disk.

According to an exemplary embodiment, the entire pattern 15 carried by the fitted cover 10 may be back-lighted uniformly and may be seen distinctly. In addition, the side walls 13 of the fitted cover 10 may reflect a portion of the light guided by the body 1 towards the front face 14 of the fitted cover 10, thereby increasing the visibility of the pattern 15.

According to various exemplary embodiments, one of the faces of the fitted cover 10 (e.g., the inside face) may be coated by silkscreen printing with fine diffusing layers for making more uniform the light that back-lights the pattern that was printed before the diffusing layers.

Figure 3:
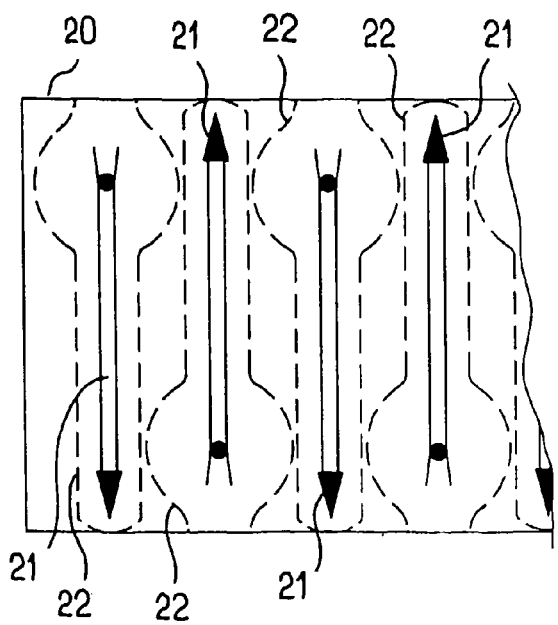
FIG. 3 is a view of a sheet of transparent material used for fabricating the fitted covers of the invention according to an exemplary embodiment.

Referring to FIG. 3, fitted covers can be mass-produced using the following method. On a sheet 20 of transparent plastic material (e.g., polycarbonate, etc.), a series of patterns 21 is printed. The sheet 20 is then cut around the outlines 22 (shown as dashed lines) so as to obtain a set of sheet portions, each sheet portion including a pattern 21. Thereafter, the sheet portions are cut out and are thermoformed so as to form fitted covers 10. The fitted covers 10 then may be engaged to bodies 1 of pointers.

It is thus very easy to produce pointers with a variety of patterns. Also, when overhauling the gauge or the machine including the gauge (e.g., car, motorcycle, etc.) a user may change the pattern of the pointer at will by replacing the cover fitted on the pointer, without having to remove or replace the pointer body.

Figure 4:
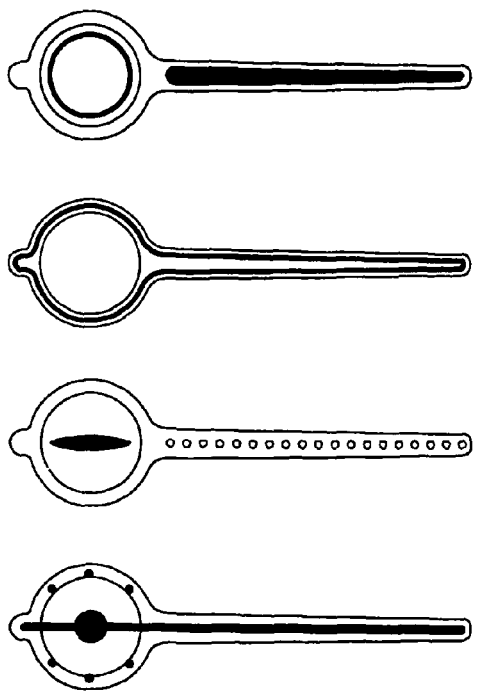
FIG. 4 illustrates various types of fitted covers according to various exemplary embodiments.

As an illustration, FIG. 4 shows a variety of exemplary fitted covers that can be produced, thus enabling pointers to be personalized.

The invention is not limited to the above description, but on the contrary covers any variant falling within the scope of the claims.

In particular, although the fitted covers may be provided with diffusion layers for making the light back-lighting the pattern more uniform, it is possible, according to an alternative embodiment, to treat one of the faces of the fitted cover mechanically or chemically in order to give it a texture enabling it to diffuse light. Colored transparent layers may also be applied to the fitted cover for the purpose of changing the color of the pointer.

Although it is stated that a diffusing screen is placed over the hub between the fitted cover and the body of the pointer, it is possible to omit such a diffusing screen. This omission may be particularly effective if the sheet forming the fitted cover has been treated to diffuse light.

Although it is stated that the sheet of transparent material is cut before the cut out portions are thermoformed, it is possible to thermoform the sheet so as to obtain a series of covers for fitting that are still connected to one another, and then to cut apart the covers.

The invention claimed is:

1. A pointer for a gauge, the pointer comprising:
   a body of transparent material, the body including a hub and an indicator portion extending from the hub; and
   a fitted cover of transparent material to cover the body, the fitted cover comprising side walls configured to snap elastically onto the pointer body, the fitted cover including a visible pattern.

2. The pointer of claim 1, wherein the fitted cover comprises a portion of transparent sheet material that has been thermoformed.

3. The pointer of claim 2, wherein the fitted cover is configured to be resiliently snap-fastened snugly onto the body of the pointer.

4. The pointer of claim 1, wherein the indicator portion has a rear face carrying a reflecting coating.

5. The pointer of claim 1, wherein the pointer includes a diffusing screen between the hub and the fitted cover.

6. The pointer of claim 5, wherein the diffusing screen is one of a transparent plastic screen having a finely grooved surface or a white diffusing plastic screen.

7. The pointer of claim 1, wherein the fitted cover has dimensions to match those of the body so that the fitted cover can snugly engage the body.

8. The pointer of claim 1, wherein the fitted cover includes a front face and wherein the side walls are configured to reflect light toward the front face.

9. A cover of transparent material for fitting to a pointer body, the pointer body including a hub and an indicator portion extending from the hub, the cover comprising:
   a first portion adapted to cover the hub;
   a second portion adapted to cover the indicator portion;
   a face including a pattern; and
   side walls configured to snap elastically onto the pointer body.

10. The cover of claim 9, wherein the side walls are configured to reflect light from the pointer body to the face of the cover so as to increase the visibility of the pattern.

11. The cover of claim 9, wherein the pointer body is visible through the cover.

12. A pointer for a gauge, the pointer comprising:
   a body including a hub and an indicator portion extending from the hub; and
   a fitted cover configured to be securable to, and removable from, the body, the fitted cover comprising side walls configured to snap elastically onto the pointer body, and the fitted cover being made of a transparent material and including a visible pattern on the transparent material.

\* \* \* \* \*